Feb. 19, 1957 A. W. BILLS ET AL 2,781,611
DOLL FOR SELECTIVELY EXHIBITING SYMPTOMS OF SICKNESS
Filed Nov. 24, 1953 2 Sheets-Sheet 2
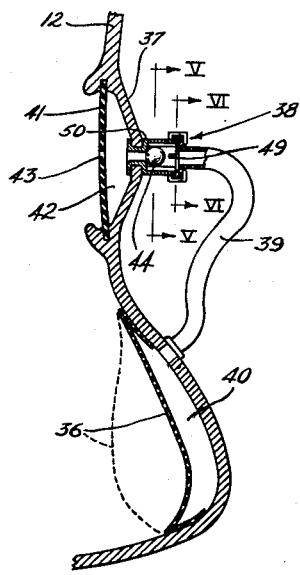
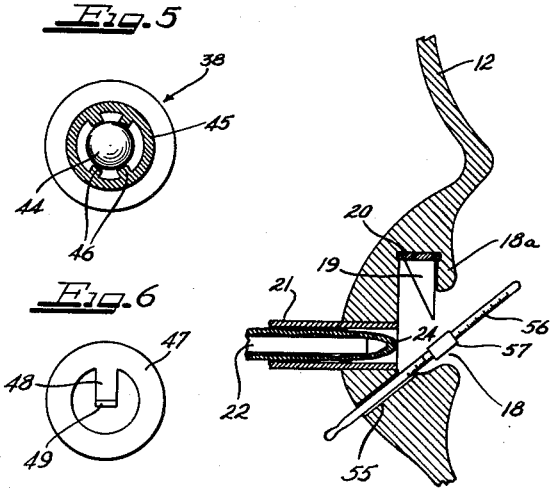
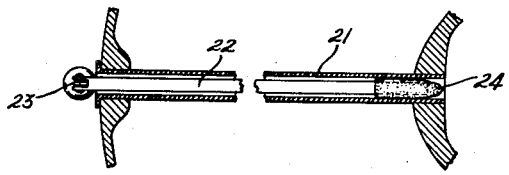
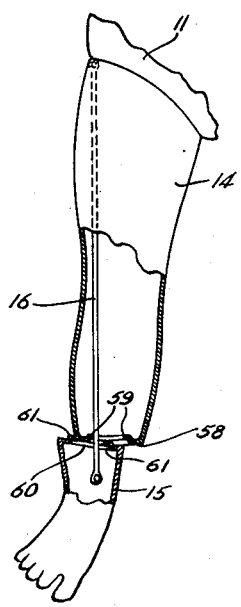
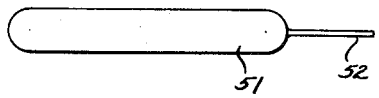
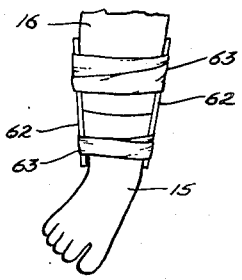
Inventors
ANITA WEST BILLS
DOROTHY S. CLARK United States Patent Office 2,781,611
Patented Feb. 19, 1957

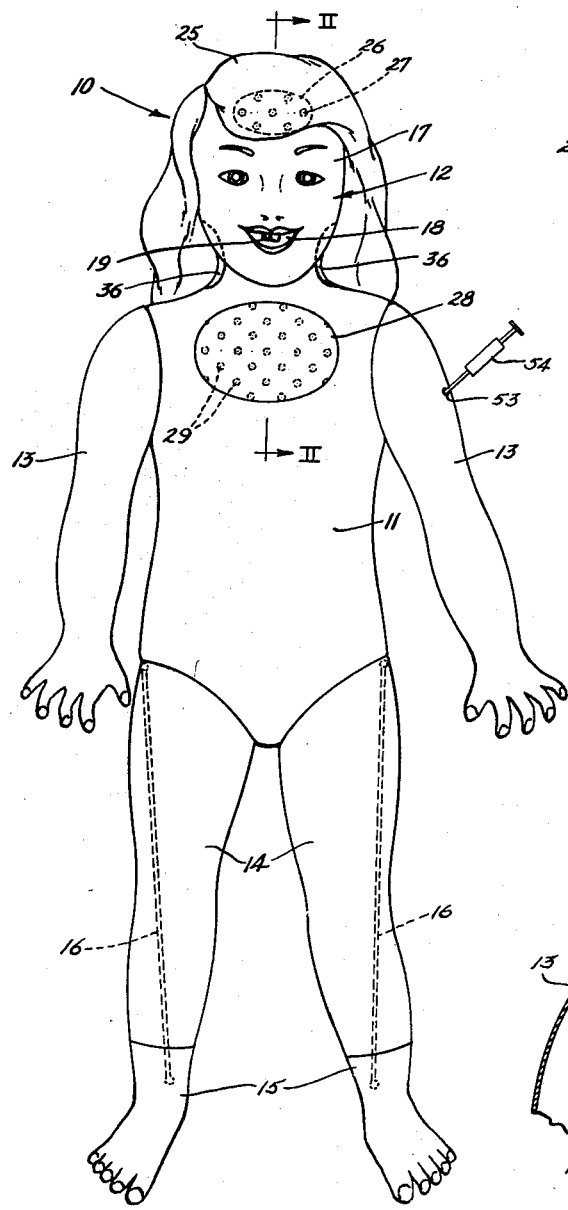
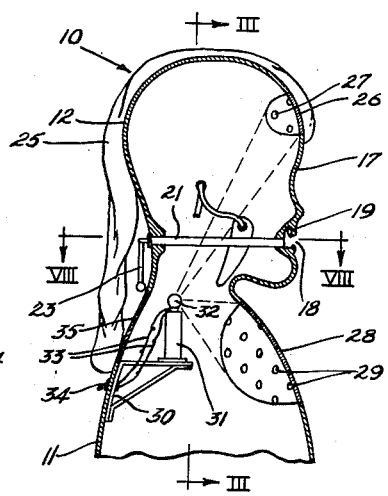
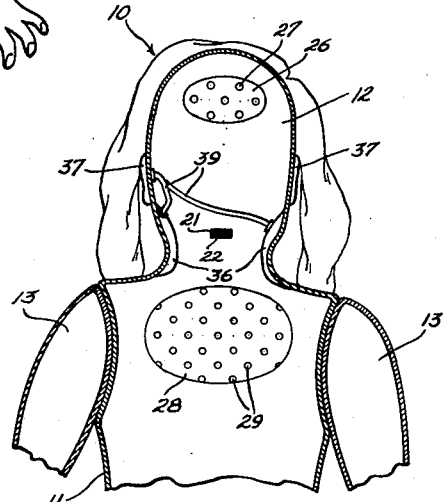
Inventors
Anita West Bills
Dorothy S. Clark

2,781,611

DOLL FOR SELECTIVELY EXHIBITING SYMPTOMS OF SICKNESS

Anita West Bills and Dorothy S. Clark, Northbrook, Ill.

Application November 24, 1953, Serial No. 394,103

5 Claims. (Cl. 46—135)

This invention relates to a doll that can take "sick." More specifically, this invention deals with a doll that can be manipulated to simulate broken bones and to exhibit symptoms of various diseases such as measles, mumps, chicken pox, fever, and the like.

According to this invention there is provided a doll having a molded body having one or more translucent portions and inflatable portions. An electric light mechanism mounted in the body selectively illuminates the translucent portions of the body for rendering visible pock marks or the like to simulate a rash on the doll. The inflatable portions are preferably provided on the sides of the neck. Mechanism, preferably located in the ear portion, can be actuated to inflate these portions causing them to distend in simulation of mumps. The head has a mechanism for shifting a tongue piece out of and into the mouth and the mouth is arranged to removably receive a simulated thermometer. This tongue piece can be capped to simulate healthy and unhealthy conditions. Teeth in the mouth are removably mounted by magnetic means. One or more of the appendages of the doll's body, such as a leg, is segmented so that a portion therein can be offset to simulate a break. An elastic retaining member will hold the segmented sections or appendages in either aligned or misaligned arrangement. One of the appendages such as an arm, is provided with a hole for receiving a hypodermic needle.

It is then an object of this invention to provide a doll which can be controlled to selectively exhibit various symptoms.

A further object of this invention is to provide a doll which can be manipulated to exhibit symptoms of various diseases.

Another object of this invention is to provide a play kit including a doll and appurtenances for treating the doll in simulation of medical and nursing treatment.

A still further object of this invention is to provide a doll with translucent portions in the body thereof which will blend into the body but which can be illuminated to exhibit a rash or the like on the body.

An important object of this invention is to provide a doll with inflatable bladder portions that can be distended to simulate mumps or the like.

A still further object of the invention is to provide a doll with a shiftable tongue piece carrying a removable cap to selectively simulate a healthy or diseased condition.

A still further object of this invention is the provision of a doll with magnetically retained teeth.

Other and further objects of this invention will be apparent to those skilled in the art from the following detailed description of the annexed sheets of drawings which, by way of a preferred example only, illustrate one embodiment of the invention.

On the drawings:

Figure 1 is a front elevational view of the doll according to this invention.

Figure 2 is a fragmentary vertical cross-sectional view, with parts in elevation, taken along the line II—II of Figure 1.

Figure 3 is a fragmentary longitudinal cross-sectional view taken along the line III—III of Figure 2, with parts in elevation.

Figure 4 is an enlarged fragmentary detail view with parts in elevation, illustrating the mechanism for inflating a mump-simulating bladder or diaphragm.

Figure 5 is an enlarged transverse cross-sectional view taken along the line V—V of Figure 4.

Figure 6 is an enlarged vertical cross-sectional view taken along the line VI—VI of Figure 4.

Figure 7 is an enlarged fragmentary detailed cross-sectional view illustrating the mouth portion of the doll to show the manner in which the teeth are retained and to illustrate the manner in which a thermometer can be removably inserted.

Figure 8 is an enlarged broken horizontal cross-sectional view with parts in elevation taken along the line VIII—VIII of Figure 2.

Figure 9 is a plan view of a tongue-depressing spatula and an air release device for the doll.

Figure 10 is a fragmentary elevational view with parts in vertical cross-section illustrating the manner in which a segment of the doll's leg can be misaligned to simulate a broken leg.

Figure 11 is a view similar to Figure 10 but illustrating the manner in which the leg can be held by splints for "mending" the break.

As shown on the drawings:

The doll 10 of Figures 1 to 3 includes a hollow molded plastic or rubber trunk or body portion 11 with a hollow molded plastic or rubber head 12 thereon. Hollow molded plastic or rubber arms and legs 13 and 14 are also carried by the trunk 11. The head, legs and arms can be integral with the trunk or can be movably mounted thereon in accordance with standard doll body manufacturing techniques. The legs 14 have separate feet sections 15 retained thereon by elastic bands 16 anchored in the interior of the feet portion and preferably near the tops of the hollow leg portions for a purpose to be more fully described hereafter. If desired, similar segment arm sections could be provided on the ends of the arms 13 and held by means of elastic bands or the like.

The head 12 is provided with a doll's face 17 having an open mouth 18 exposing several teeth 19 under the upper lip thereof. As shown in Figure 7, these teeth 19 are composed of metal and are removably retained in the mouth 18 behind the upper lip 18a thereof by a permanent magnet 20 which is molded into the mouth. The teeth can be removed to simulate loss of teeth in a child and can be easily replaced by magnetic attraction of the magnet 20 for paramagnetic metal material of the teeth.

A tube 21 spans the interior of the head 12 and is mounted at its front end in the mouth 18 and at its rear end in the back of the head. This tube 21 as best shown in Figures 7 and 8, slidably carries a rod 22 having a pivoted section 23 on the rear end thereof and a removable plastic or cloth tongue piece 24 in the front end thereof. The tongue piece 24 is replaceable and the kit furnished with the doll of this invention will contain tongue pieces of different colors including gray and red to simulate healthy and sick conditions. The pivoted section 23 will normally drop by gravity to depend from the rod on the back of the head as shown in Figure 2. However, the pivoted portion 23 can be tilted into alignment with the tube 21 and inserted in the tube to shift the rod 22 for ejecting the tongue piece 24 through the mouth 18 to expose the tongue. When the pivoted piece 23 is then retracted from the tube 21, it will again drop by gravity behind the head 12 to be hidden by a wig of hair 25 on the head 12.

The forehead portion of the head 12 preferably has a translucent portion including a film 26 of translucent material covering an opening in the forehead and blending into the head material so as not to be distinguishable therefrom. This translucent material is spotted at 27 on the inside face thereof to simulate a rash. The spots 27 are not visible through the translucent film 26 unless the interior of the doll's head is illuminated. The chest portion of the trunk 11 has a similar translucent film 28 covering an opening therein and this film has spots 29 on the inner face thereof which can be the same or different from the spots 27. The spots 29 are not visible through the film 28 unless the interior of the trunk 11 is illuminated.

Alternately, if desired, the spots 27 can be made permanently visible as indicia on the body or head normally covered by the doll's clothing or hair and accessible to full view by opening the clothing or parting the hair of the wig 25 to expose the doll's chest or the like.

As shown in Figure 2, a mounting bracket 30 is carried in the trunk 11 on the back wall thereof to support a small electric battery 31. A flashlight bulb 32 is mounted on the battery 31 and is selectively energized from the battery through wires 33. A switch 34 on the back of the trunk 11 controls the energization of the light 32. As illustrated, the light beams from the bulb 32 will illuminate the films 26 and 28 to render the spots 27 and 29 visible from outside of the doll's body. These spots will simulate measles, chicken pox, or other rash disorders.

A small flap-type door 35 is provided on the back of the trunk 11 to give access to the interior of the trunk for replacement of the battery and bulb. The hair from the wig 25 will cover this door.

The sides of the neck portion of the head 12 carry distendable diaphragms or bladders 36 as shown in Figures 3 and 4. One of the ear portions 37 in the head 12 carries a check valve assembly 38 from which a pair of flexible tubes 39 extend to the spaces behind the diaphragms or bladders. These spaces 40 are adapted to be filled with air from the tubes 39. As best shown in Figure 4, the ear 37 is covered with a flexible membrane 41 molded into the head material around its periphery. A space 42 is provided between the membrane and ear. This space communicates with the interior of the cage of a check valve assembly 38. The membrane 41 has a central hole 43 therethrough. The arrangement is such that when the finger or thumb of an operator covers the hole 43 and depresses the membrane 41 toward the bottom of the ear 37, air in the space 42 will flow through the check valve cage 38 and tubes 39 to the interior of the spaces 40. Upon release of the membrane 41, it will spring back into position to reclaim the space 42. However, a ball check 44 in the valve assembly 38 will seal the tubes 39 to retain air in the chambers 40 behind the bladders 36. The space 42 will again become filled with air and repeated covering of the membrane hole 42 and depressing of the membrance to eject air from the space 42 through the tubes 39, will result in pumping air into the spaces 40 to distend the bladders 36 to the dotted line positions such as shown in Figure 4. The sides of the doll's head will thereby have distended portions simulating mumps.

As shown in Figures 4 and 5, the ball check 44 is mounted in a tubular cage 45 on guide ribs 46. A back plate 47 in the rear of the cage 38 behind the ball 41 has a tongue 48 with a forwardly projecting flange 49 to limit backward movement of the ball. During pumping action, the ball will move away from the seat 50 in the mouth of the cage of the assembly 38 and air will flow from the space 42 into the tubes 39. Back pressure from the tubes 39 will force the ball back against the seat 50 to retain air in the spaces 40. This check valve arrangement provides a simple means of controlling air flow into the spaces 40 and for retaining the bladders in distended condition.

As shown in Figure 9, a tongue spatula 51 is provided with a projection 52 on one end thereof. This projection 52 can be inserted through the hole 43 in the membrane 41 to unseat the ball 44 and release air from behind the bladders so that they will again assume their collapsed normal condition.

As shown in Figure 1, one of the arms 13 preferably has a hole 53 therein to receive a toy hypodermic needle 54.

As shown in Figure 7, the bottom of the mouth 18 has a hole or opening 55 therein to receive in snug relation a thermometer 56 therethrough. This thermometer can be a toy device with a manually shiftable temperature indicator 57 slidable on the stem of the thermometer. The thermometer stem can be readily inserted into and removed from the hole 55.

As shown in Figure 10, the foot section 15 is misaligned from the bottom of the leg 14. For this purpose the bottom of the leg has an end wall 58 with a recess therein bounded by an inturned flange 59. The foot portion 15 has a top wall 60 mating with the wall 58 and equipped with raised protuberances 61 for selective fitting in the recess to be retained by the flange 59. The protuberances 61 can be misaligned from the recess with one protuberance engaged against the outside wall of the leg 14 to hold the foot portion 15 out of alignment with the leg 14. The elastic bands 16 will hold the end faces 58 and 60 in mating engagement.

The doll kit of this invention is equipped with splints and bandages and, as shown in Figure 11, the "broken leg" of Figure 10, can be placed in alignment and bound in a splint for "mending." For this purpose, splint pieces 62 are held on the leg and foot portions by a bandage wrapping 63.

The trunk, head, arms and legs of the doll can be made of similar or dissimilar materials although the preferred arrangement is to have all of the parts made of a form-retaining resilient plastic material such as "Fairy Skin" (vinyl copolymer resin). Any form-retaining doll body material can be used. The tubes for passage of air from the ear pump are preferably formed of rubber of flexible plastic. The bladders 36 are preferably formed of rubber or other distendable impermeable plastic material. The translucent films 26 and 28 are preferably formed of plastics and are preferably molded into the trunk and head portions so as to be blended therewith and be invisible unless illuminated.

It will be appreciated that the herein specifically described arrangements may be modified and appreciably changed without departing from the principles of this invention providing a doll that can "take sick."

We claim as our invention:

1. A doll adapted to exhibit symptoms of sickness which comprises a body having a head and neck portion, diaphragms on the sides of the neck portion confining spaces therebehind, a pump mechanism on said head portion adapted to compress air into said spaces for distending said diaphragms to simulate mumps on the neck portion, a check valve for retaining compressed air in said spaces, and mechanism for selectively releasing said check valve.

2. A doll adapted to simulate mumps which comprises a doll body having a hollow head portion, inflatable bladders on the sides of the head portion, tubes in said head portion communicating with the interiors of said bladders, a check valve controlling flow through said tubes and adapted to retain compressed air in said bladders, said head having an ear portion providing a recess communicating with said check valve, an apertured diaphragm overlying said recess and adapted to have the aperture therethrough covered by the finger of an operator, said diaphragm adapted to be deflected for pumping air past said check valve and through said tubes into said bladders to inflate the bladders in simulation of mumps, and means insertable through the aperture in said diaphragm for depressing said check valve to release compressed air from the bladders.

3. A doll adapted to exhibit symptoms of mumps which comprises a doll's body having a hollow head and neck portion, inflatable bladders anchored on the sides of the neck portion, pumping mechanism inside of the doll's head for inflating said bladders to distend the same in simulation of mumps, said pumping mechanism including means accessible from outside the head for actuating the pumping mechanism, and means accessible from outside the head for deflating the bladders.

4. A take-sick doll which comprises a doll's body having a head portion, a hollow tube spanning said head portion, said head portion having an open mouth receiving the front end of said tube, a shiftable rod in said tube, mechanism on said rod accessible from the rear of the head for shifting the rod through the tube to project from the mouth, and a tongue-simulating end piece on said rod.

5. A doll for exhibiting symptoms of disease and injury in response to manipulation thereof comprising, a body simulating a human torso and head, appendages on said body forming a pair of arms, and a pair of legs corresponding in configuration and placement to appendages of the human body, said body portion having surface forming means thereon corresponding to the human skin surface and including at least one translucent portion bearing indicia markings which are normally not visible and which represent symptomatic conditions of disease and injury, a light source inside of said body for directing rays of light outwardly of said body and through said translucent portion, thereby to make visible said indicia markings on said surface forming means, and circuit means including a switch on said body portion in an accessible position for controlling the selective energization of said light source.

References Cited in the file of this patent

UNITED STATES PATENTS

| | | |
|---|---|---|
| 858,090 | Meinecke | June 25, 1907 |
| 902,113 | Ruple | Oct. 27, 1908 |
| 928,744 | Fisher | July 20, 1909 |
| 1,013,875 | Forquer | Jan. 9, 1912 |
| 1,160,080 | Ito | Nov. 9, 1915 |
| 1,485,641 | Sparks | Mar. 4, 1924 |
| 1,787,207 | Marcus et al. | Dec. 30, 1930 |
| 1,932,216 | Kallus | Oct. 24, 1933 |
| 2,199,049 | Greenburg | Apr. 30, 1940 |
| 2,203,562 | Edwards | June 4, 1940 |